Figure 1:
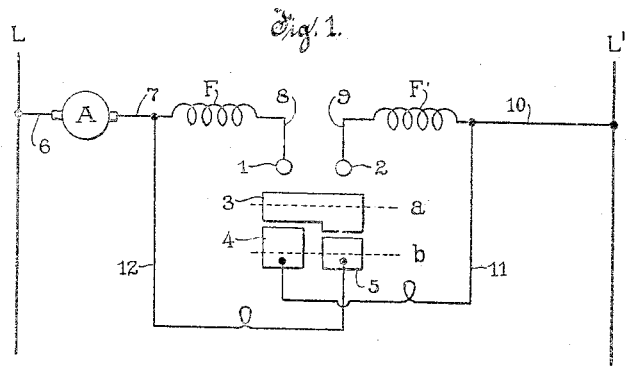

G. R. RADLEY.
CIRCUIT CONTROLLER.
APPLICATION FILED MAR. 30, 1914.

1,300,484.

Patented Apr. 15, 1919.

UNITED STATES PATENT OFFICE.

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

CIRCUIT-CONTROLLER.

1,300,484.  Specification of Letters Patent.  Patented Apr. 15, 1919.

Application filed March 30, 1914. Serial No. 828,353.

*To all whom it may concern:*

Be it known that I, GUY R. RADLEY, a citizen of the United States, residing at Milwaukee, in the county of Milwaukee and State of Wisconsin, have invented new and useful Improvements in Circuit-Controllers, of which the following is a full, clear, concise, and exact description, reference being had to the accompanying drawing, forming a part of this specification.

This invention relates to improvements in circuit controllers.

It has among its objects to provide a controller of substantially the so-called drum type which will effect given circuit changes with a minimum number of contacts and with a compact arrangement of such contacts.

A further object is to provide a simplified form of series parallel controller particularly applicable to electric vehicles to commutate the motor field windings.

Various objects and advantages of the invention will hereinafter appear in connection with the embodiment thereof illustrated in the accompanying drawing and now to be described.

Figure 2:
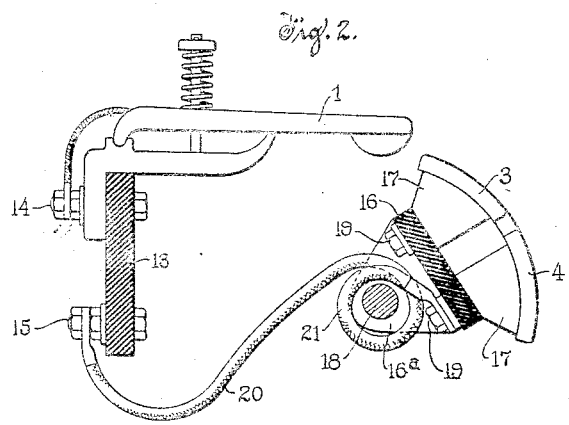

In the drawing,

Figure 1 shows diagrammatically the controller, an electric motor and field commutating connections between said controller and said motor and, Fig. 2 is a view, partly in section, of a mechanical embodiment of the controller shown in Fig. 1.

Referring more specifically to the drawing, the controller includes two stationary contact fingers 1 and 2 and three contact segments 3, 4 and 5 to be moved into and out of engagement with said contact fingers as hereinafter set forth.

The motor is shown as provided with an armature A and two series field windings F and F', said windings to be commutated by the controller. As illustrated, the controller also serves to open and close the motor circuit, but it should be understood that if desired, separate means might be provided to control the continuity of the motor circuit.

The controller is shown in off position and as having two operative positions denoted as "*a*" and "*b*." When in position "*a*" the controller bridges contact fingers 1 and 2 by segment 3. This completes circuit from line L by conductor 6 through the motor armature by conductor 7 through the field winding F by conductor 8 to contact finger 1 thence across segment 3 to contact finger 2 by conductor 9 through field winding F' by conductor 10 to line L'. This completes the continuity of the motor circuit with the field windings in series with one another.

The controller upon continued movement toward position "*b*" first effects engagement between segment 4 and contact finger 1 while said contact finger still engages segment 3. This effects a short circuit of the field winding F', said short circuit extending from the left hand terminal of said winding to contact finger 2, across segment 3 to contact finger 1 and segment 4 by conductor 11 to conductor 10 and thence to the right hand terminal of said winding. At this time, however, circuit is maintained through the armature A and field winding F, and the construction and arrangement of the segments is such that upon continued movement of the controller segment 5 engages finger 2 before said circuit is opened. In consequence the controller is movable from position "*a*" to position "*b*" without interruption of the motor circuit and when attaining position "*b*" it parallels the field windings as follows. The circuit of winding F extends from conductor 7 through said winding to finger 1 and segment 4 by the conductors 11 and 10 to line L'. The circuit of winding F' also extends from conductor 7 by conductor 12 to segment 5 and finger 2 by conductor 9 through said winding to conductor 10 and line L'.

Thus with only two contact fingers and three segments the motor field windings may be commutated without interruption of the motor circuit. Also the commutation is effected with a relatively small movement of the segments.

Referring now to Fig. 2, the same shows one of the contact fingers, which may be assumed to be finger 1, and two segments, which may be assumed to be segments 3 and 4. The contact finger 1 is of conventional form and is mounted upon an insulated block 13. The block 13 carries a terminal 14 for the contact finger and terminal 15 for the purpose hereinafter set forth. Of course in practice the block 13 may be utilized for both contact fingers and may be provided with a plurality of terminals 14 and 15, The segments are carried by an insulating block 16 supported by bracket 17 upon a shaft 18 and in practice the block may carry all of the segments and may either be revoluble on said shaft or fixed thereto to revolve therewith. The segments are preferably formed of contacting strips suitably fixed to castings 16ª in turn secured to the block 16 by suitable means such as screws or bolts 19. With this arrangement, the segments may be mounted upon separate spaced castings and thereby rendered electrically independent of one another or may be mounted upon a common casting where it is desired to electrically connect the same.

For establishing the necessary connections to the contact segments flexible insulated leads are carried thereto from the terminals 15 on the block 13. As illustrated in Fig. 2 such a lead 20 is provided for the segment 4, said lead having a portion 21 looped around the shaft 18 and having its extremity connected to said segment by the screw 19. With this arrangement it will be observed that the usual objection to flexible leads is entirely eliminated. The arrangement requires only a very slight slack of the lead and provides for support of the lead in such a manner as to avoid entanglement thereof with other parts of the controller, to practically eliminate wear thereon as well as drag thereof on the movable contact member.

The advantages of the controller will now be readily apparent especially when consideration is given to the decreased cost by elimination of contacts, and to the simplification of construction and reduction of overall dimensions of the controller due to the aforesaid reduced number of contacts.

What I claim as new and desire to secure by Letters Patent is:—

1. A circuit controller having two contacts and three segments adapted to coöperate therewith, said contacts being provided with electrical connections and being arranged to provide series circuit connections in one coöperative position and parallel circuit connections in another position and to maintain continuity of circuit during movement from one position to the other.

2. A series parallel controller provided with two contacts, three coöperating segments, one to bridge the same and connections whereby the remaining two segments coöperate with said contacts to establish parallel connections therethrough, one of said last two mentioned segments engaging its respective contact prior to interruption of circuit between said contacts and said first mentioned segment.

3. A circuit controller provided with two contacts and three segments adapted to coöperate therewith, said contacts and said segments having electrical connections and being arranged upon relative movement thereof from one coöperative position to another to commutate the connections of the controlled circuits from series to parallel or vice versa and to maintain continuity of circuit during such commutation.

In witness whereof, I have hereunto subscribed my name in the presence of two witnesses.

GUY R. RADLEY.

Witnesses:
TEKLA BEST,
J. L. JOHNSON.